United States Patent [19]

Forch

[11] Patent Number: 4,709,930

[45] Date of Patent: Dec. 1, 1987

[54] SHAFT AND SEALING RING

[75] Inventor: Hans Forch, Birkenau, Fed. Rep. of Germany

[73] Assignee: Firma Carl Freudenberg, Weinheim/Bergstr., Fed. Rep. of Germany

[21] Appl. No.: 708,704

[22] Filed: Mar. 6, 1985

[30] Foreign Application Priority Data

May 19, 1984 [DE] Fed. Rep. of Germany ....... 3418738

[51] Int. Cl.⁴ .......................... F16J 15/32; F16J 15/54
[52] U.S. Cl. ..................................... 277/68; 277/134; 277/152
[58] Field of Search ................... 277/25, 67, 134, 152, 277/68; 366/88, 79

[56] References Cited

U.S. PATENT DOCUMENTS

| | | | |
|---|---|---|---|
| 2,860,896 | 11/1958 | Naumann | 277/134 |
| 3,164,375 | 1/1965 | Frenkel | 366/88 |
| 3,231,285 | 1/1966 | Weltmer et al. | 277/25 X |
| 3,246,901 | 4/1966 | Wickli | 277/134 X |
| 3,251,601 | 5/1966 | Harvey | 277/25 X |
| 3,259,393 | 7/1966 | Desa | 277/134 |
| 3,504,918 | 4/1970 | Halliday | 277/134 |
| 3,558,235 | 1/1971 | Van Herpt | 277/134 X |
| 3,746,350 | 7/1973 | Mayer et al. | 277/134 X |
| 3,752,489 | 8/1973 | Latinen | 277/134 X |
| 3,779,521 | 12/1973 | Godlines | 366/79 |
| 3,913,925 | 10/1975 | Gyory | 277/134 X |
| 3,940,153 | 2/1976 | Stocker | 277/25 X |
| 4,084,825 | 4/1978 | Ludwig | 277/134 X |
| 4,118,856 | 10/1978 | Bainard | 277/134 X |
| 4,132,421 | 1/1979 | Corsi et al. | 277/134 X |
| 4,519,712 | 5/1985 | Barr | 366/88 X |

Primary Examiner—Allan N. Shoap
Attorney, Agent, or Firm—Felfe & Lynch

[57] ABSTRACT

In the combination of a shaft with a polymeric ring having a sealing surface which flares against a counter surface on the shaft to form a dynamic sealing zone therebetween upon relative rotation of the shaft and ring, both the sealing and counter surfaces have hydrodynamically-acting feed-back elements for pumping fluid which seeps between the surfaces upon the relative rotation. The resultant, net axial component of pumping actions of the elements is in one axial direction along the shaft to pump the fluid back into the space from which it came, but the elements have different pumping actions. The different pumping actions produce a fluid circulation in the dynamic sealing zone which inhibits seal-wearing granular deposits.

6 Claims, 2 Drawing Figures

SHAFT AND SEALING RING

BACKGROUND OF THE INVENTION

The invention relates to the relatively-rotatable combination of a shaft and a sealing ring thereabout.

A known seal for sealing about a rotatable shaft has a stationary annular polymeric sealing ring. An inner, sealing surface of the ring resiliently flares against a counter surface on the shaft to form a seal therebetween. To aid this, the sealing surface has at least one hydrodynamically-acting back-feed element for pumping back fluid which seeps between the sealing and counter surfaces upon the rotation therebetween.

U.S. Pat. No. 3,572,732 describes a shaft seal of this type. It has excellent reliability of operation as long as the seal is in like-new condition. Deposits from the sealed fluid, for example entrained particles as are especially likely from lubricating oil, can quickly change this condition, however. Premature failure of the seal is the consequence.

SUMMARY OF THE INVENTION

The invention is, therefore, addressed to the problem of improving the durability of such a shaft seal.

This is done with a shaft and sealing ring combination which inhibits seal-wearing, tightly-adherent deposits from a fluid to be sealed in the dynamic sealing zone between a sealing surface of a flared, polymeric, annular sealing ring and a counter surface therefor on a shaft. It also improves the cooling of the fluid in the dynamic sealing zone to prevent, reliably, sufficient heating for the formation of so-called "oil carbon."

The deposit inhibition is achieved with a seal of the type described above by providing the counter surface of the shaft, in addition to the sealing surface of the ring, with at least one hydrodynamically-acting back-feed element having a different pumping action than the one on the ring sealing surface. The different pumping actions circulate the fluid in the dynamic sealing zone to prevent deposit adherence and promote contact with the surface of the shaft. Particularly when the shaft is metal, as is often the case, the latter results in substantially-improved removal of heat from the dynamic sealing zone. Exceeding the critical temperature at which oil carbon precipitates from lubricating oil is thereby prevented.

The different pumping action of the elements on the sealing and counter surfaces can be opposite axial pumping directions as long as the resultant, net axial component of the pumping action is in the axial direction along the shaft toward the space to be sealed. Natural wear can, however, considerably change the conditions originally present in this regard. An embodiment in which the pumping action of the elements is in the same axial direction, toward the sealed space, is therefore preferred. In this case, the difference in pumping action is one of velocity to produce the circulation for the object deposit inhibition. A transverse, radial pumping direction is also a suitable difference.

The pumping elements can have any of the configurations known for hydrodynamically-acting back-feed elements, but from the standpoint of cost-effective manufacture, preference is given to elements formed by at least one spiral feature (a, groove or rib) around each of the sealing and counter surfaces. Hydrodynamically-acting back-feed elements of this kind can be manufactured easily by machining, grinding, or cutting methods.

The preferred range of the ratios of the depth or elevation and pitch between spiral elements on the sealing and counter surfaces is form about 1:2 to about 1:300, with the particularly preferred range being from about 1:5 to about 1:20, or vice versa. It does not matter which of the two surfaces has the more-active element, but from a manufacturing point of view, it has proven advantageous for the finer element to be on the shaft surface and the coarser to be on the seal surface. Some, minimal wear of the polymeric sealing surface can be accommodated or even used to advantage in this way. At the same time, the shaft no longer has to have the very-expensive, superior finish that was heretofore considered indispensable; instead, a conventional finish, such as can be easily obtained by turning or grinding at a slow speed, will suffice.

BRIEF DESCRIPTION OF THE DRAWINGS

The invention will be further explained in conjunction with appended drawings of a preferred embodiment which illustrate but do not limit the invention and wherein.

DESCRIPTION OF THE PREFERRED EMBODIMENT

Figure 1:
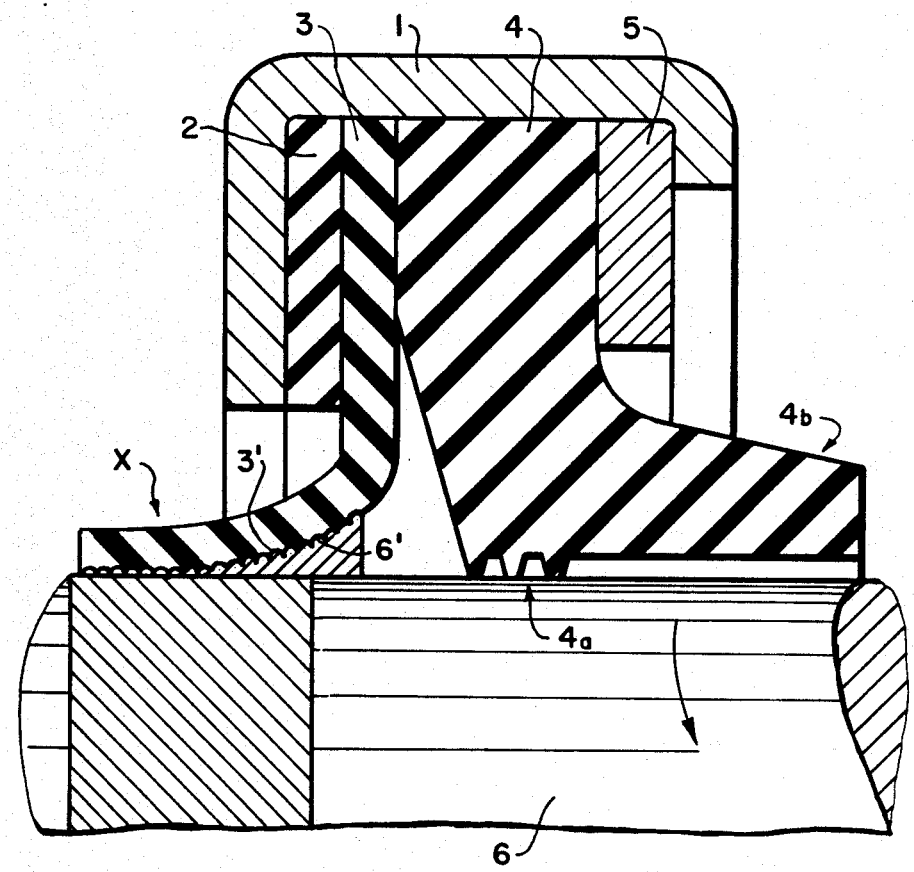
FIG. 1 is an elevation of half of a shaft and seal combination, partly in section.

The seal represented in FIG. 1 has a metallic stiffening ring 1 with an inwardly-open, inverted-U-shaped axial profile which sealingly holds a number of inwardly-projecting annular elements 2 to 5. The stiffening ring 1 is to be sealingly mounted in an opening in a structure (not shown) in which a shaft 6 is to be rotatably sealed.

The actual, rotationally-dynamic sealing zone lies in the left-hand area at X between a sealing surface 3' of one of the annular elements, element 3, and the cooperative, counter surface at 6' of shaft 6 which it flaringly engages. The element 3 is a fluorinated plastic ring fixedly gripped in the area of its outer periphery between two of the other elements, elements 2 and 4, and sealed thereby. Element 2 is an elastomeric gasket. Element 4 is a fluorinated plastic ring which is prolonged inwardly to engage the shaft at 4a and extend axially along the shaft, toward the open air, at 4b. The axial portion at 4b surrounds the surface of the sealed shaft 6 at a close enough distance to protect the dynamic sealing zone at X against contamination by foreign matter from the surroundings. The shaft-engaging portion at 4a provides safety against excessive loss of liquid from the left if the regular sealing in the area of the dynamic sealing zone X should break down. The element 5 is an annular piece of metal; in manufacture, the adjacent flange projection of the stiffening ring 1 is crimped thereagainst for axial compression which is transmitted to the external peripheral areas of the other elements 2, 3 and 4 and, thus, assures that they are held in a liquid-tight and statically-stable manner.

Figure 2:
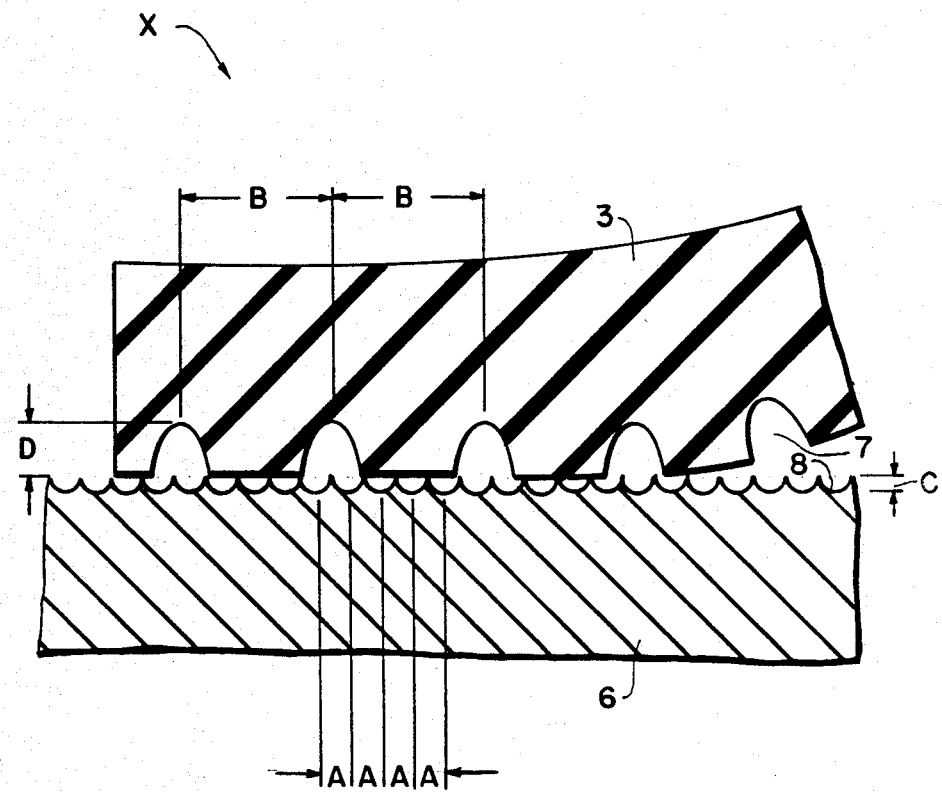
FIG. 2 is an enlargement of a left-hand portion of FIG. 1.

The dynamic sealing zone X is represented on an enlarged scale in FIG. 2 as compared to FIG. 1. One hydrodynamically-acting back-feed element is thus better seen to be formed by a spiral groove 8 around the counter surface at 6' of the sealed shaft 6. The groove 8 envelops the counter surface and several turns interrupt repeatedly the dynamic sealing zone defined with element 3 in the axial direction. The maximum depth C and pitch spacing A of the spirals of groove 8 are characterized by very small values, the depth C being from about 10 to about 20 micrometers and the spacing A being about 35 micrometers. The corresponding diameter of the shaft 6 amounts to about 90 millimeters.

The sealing surface 3' of ring element 3, however, has hydrodynamically-acting back-feed elements 7 formed by a plurality of independent, helical, parallel grooves with a pitch spacing B about five times the spacing A. The grooves have a depth D of from about 0.02 to about 0.2 mm and preferably about 0.1 mm, and form an angle of from about 30° to about 70°, and preferably about 45° with the axis of rotation. As shown in FIG. 1, the pitch is opposite to that of the groove 8. As a result of all these structural differences, grooves 7 and 8 differently pump fluid which seeps between the surfaces 3', 6' and is rotationally entrained upon relative rotation between the shaft 6 and seal 1 to 5, the net axial pumping action being leftward in FIG. 1.

It will be understood that the specification and examples are illustrative but not limitative of the present invention and that other embodiments within the spirit and scope of the invention will suggest themselves to those skilled in the art.

What is claimed is:

1. In a seal combination of a shaft with a polymeric sealing ring thereabout, the ring having an inner, sealing surface which flares against a counter surface on the shaft to form a dynamic fluid-sealing zone therebetween upon relative rotation of the shaft and ring, the improvement comprising:

first hydrodynamically-acting feed-back means having a first spiral groove on the sealing surface of the ring for pumping fluid which seeps into the dynamic sealing zone upon the relative rotation; and second hydrodynamically-acting feed-back means having a second spiral groove on the counter surface of the shaft for pumping fluid which seeps into the dynamic sealing zone upon the relative rotation, said first spiral groove having at least one dimension of its pitch and depth dimensions, respectively, which is different from that of said second spiral groove;

wherein said first and second feed-back means have different pumping actions with a net axial component of said pumping actions in an axial direction along the shaft.

2. The combination of claim 1, wherein both the first and second feed-back means pump in the same direction.

3. The combination of claim 2, wherein the ratio of at least one of the depth and pitch of the first feed-back means on the sealing surface to that of the second feed-back means on the counter surface being from about 1:2 to about 1:300.

4. The combination of claim 3, wherein said ratio is from about 1:5 to about 1:20.

5. The combination of claim 1, wherein the ratio of at least one of the depth and pitch of the first feed-back means on the sealing surface to that of the second feed-back means on the counter surface being from about 1:2 to 1:300.

6. The combination of claim 5, wherein said ratio is from about 1:5 to about 1:20.

* * * * *